United States Patent

[11] 3,628,493

| [72] | Inventor | Edward E. Headrick |
| | | 4900 Crown Ave., La Canada, Calif. 91011 |
| [21] | Appl. No. | 832,628 |
| [22] | Filed | June 12, 1969 |
| [45] | Patented | Dec. 21, 1971 |

[54] IMPELLER WHEEL FOR AMPHIBIOUS VEHICLE
19 Claims, 14 Drawing Figs.

[52] U.S. Cl. ................................................ 115/19, 115/1
[51] Int. Cl. ................................................ B60f 3/00, B63h 5/02
[50] Field of Search ........................................ 115/19, 49; 416/197; 152/209, 352

[56] References Cited
UNITED STATES PATENTS

| 100,820 | 3/1870 | Tucker | 115/49 |
| 175,405 | 3/1876 | Bardwell | 115/49 |
| 3,251,334 | 5/1966 | Beardsley | 115/49 |
| 3,335,692 | 8/1967 | Wright | 115/19 |

FOREIGN PATENTS

| 472,938 | 8/1914 | France | 115/19 |

*Primary Examiner*—Andrew H. Farrell
*Attorney*—Christie, Parker & Hale

ABSTRACT: An impeller wheel for a waterborne or amphibious vehicle for providing forward thrust and support for the vehicle. The impeller is provided with one or more transverse impact surfaces raised from the peripheral surface of the impeller angled so as to be approximately parallel to the water surface upon contact and entry into the water under forward rotation. Adjustment of the precise angle of impact, the number of impact surfaces provided on each impeller, the speed of rotation of the impellers and the number of impellers on a vehicle vary according to particular applications and desired capabilities. In several embodiments the impellers generate sufficient force to raise the vehicle hull out of the water during high-speed waterborne operation.

PATENTED DEC 21 1971

INVENTOR.
EDWARD E. HEADRICK
BY
Christie, Parker & Hale
ATTORNEYS

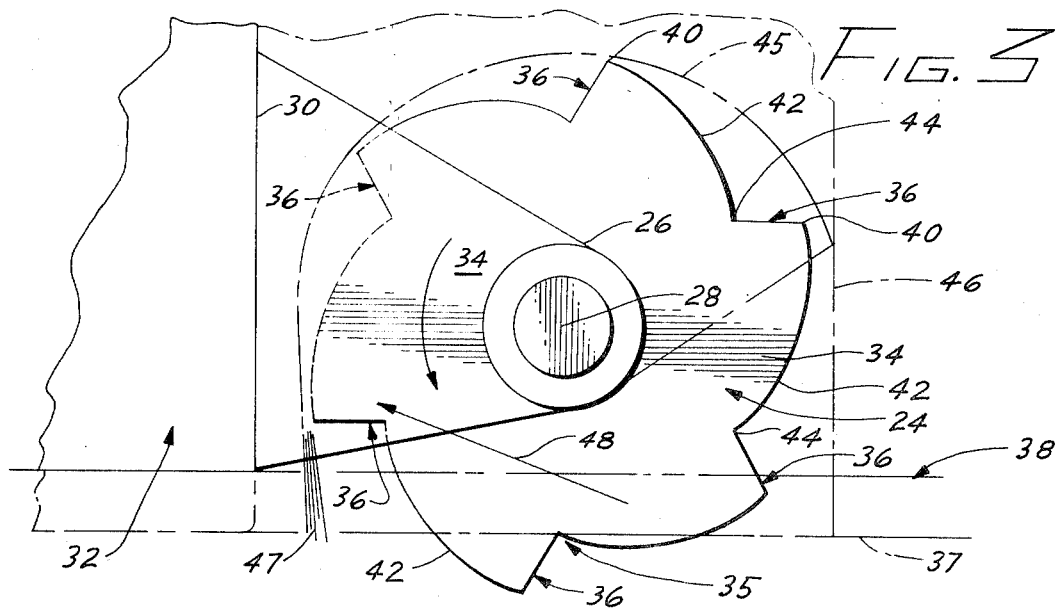
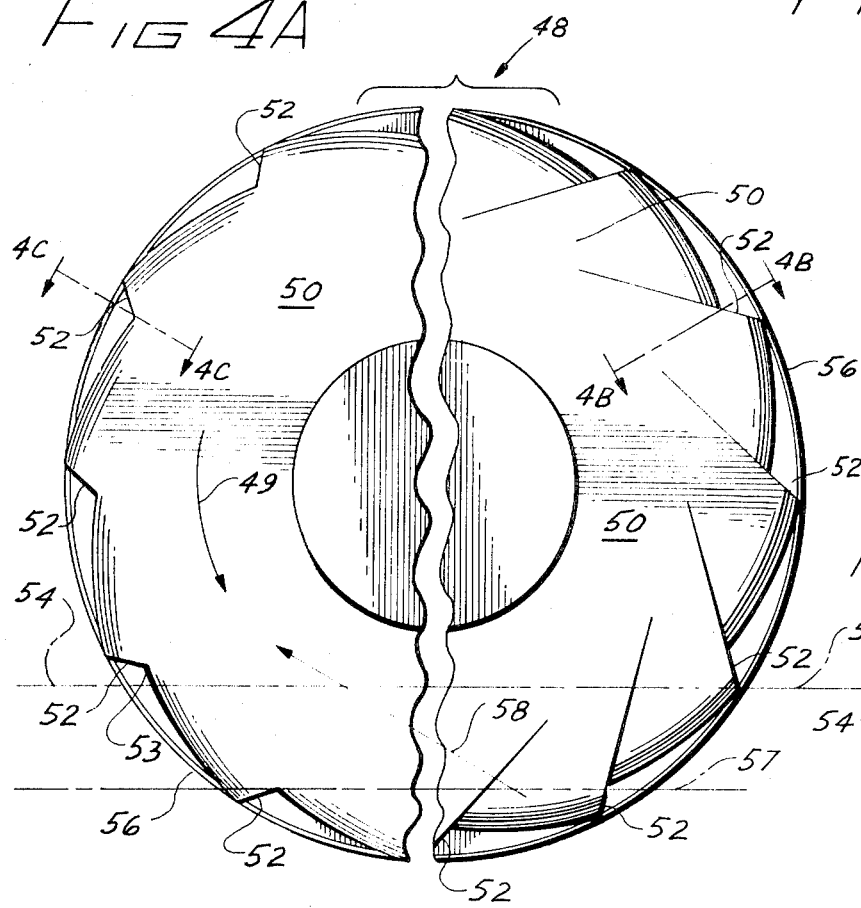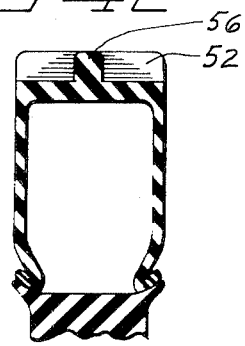

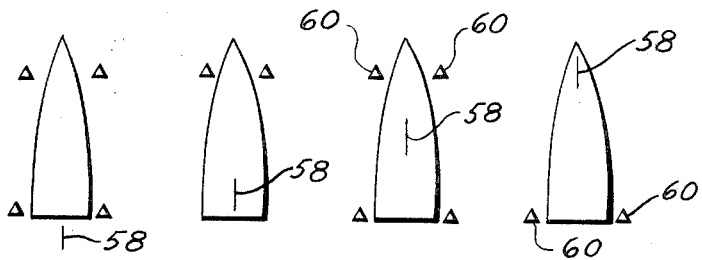
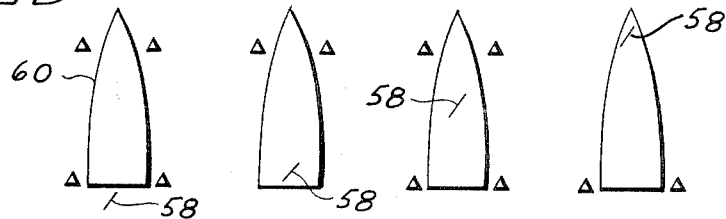
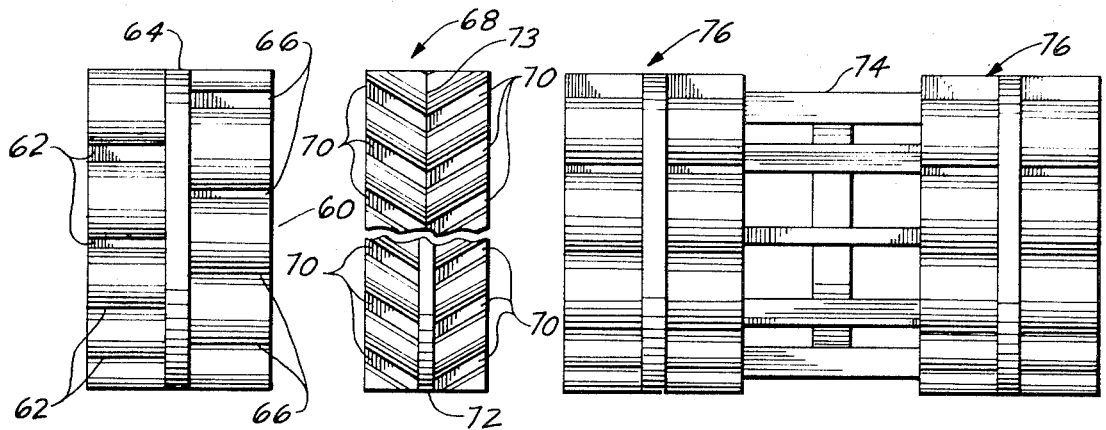
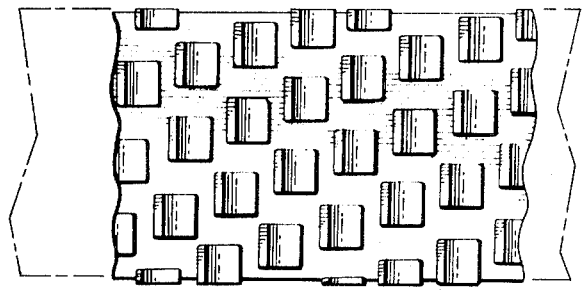

IMPELLER WHEEL FOR AMPHIBIOUS VEHICLE

BACKGROUND OF THE INVENTION

The present invention relates to wheels and in particular to tires for use with land and watergoing vehicles which are supported or propelled by the rotation of one or more such tires.

In high-speed watercraft propulsion, hulls of a special configuration, e.g., hydroplanes, or other auxiliary structures, e.g., hydrofoils, are utilized to reduce the effect of water drag on the craft. The drive means for these types of boats have typically been either high-speed propellers or water jet engines. In general, the various advances in high-speed boat performance have resulted from an ability to further reduce the amount of water drag. Despite these efforts the effect of such drag is still significant. For example, in high-speed propellers drag is particularly evident around the hub and that part of the propeller close to the hub. Likewise, the piping used on water jet boats has drag associated with it producing a further loss of efficiency.

Amphibious vehicles, i.e., vehicles capable of mobile action on both land and water, are typically wheel or track vehicles. In land operations such vehicles are not only propelled by means of power supplied to the wheels or tracks, but are also supported on the ground by these same wheels or tracks. In water operation such vehicles normally utilize water pumps, jets, or propellers as a primary or auxiliary source of power for propulsion and are supported by hulls or other means of flotation.

Another and significantly different vehicle capable of mobility both on land and water are those types of vehicles which create an air cushion to raise and support the vehicle a limited distance above the surface of the ground or water. By virtue of their capability of travelling over both land and water, such vehicles can accurately be described as amphibious and have a capability in one regard not possessed by more conventional amphibious vehicles. This capability is that of high speed, particularly on water, compared to the more conventional types. However, such air-cushioned vehicles also suffer from disadvantages such as limited utility over rough water and limited mobility at the ground-water interface, e.g., their climbout ability.

The foregoing types of amphibious vehicles, particularly the wheeled and tracked variety, are subject to a significant discrepancy between the speeds at which these vehicles travel on the two mediums over which they are designed to move. In addition, vehicles of these types may also encounter other operational problems including mobility at the air-water-ground interface or on certain types of soft terrain, for example, mud, snow, ice and swamps. This problem is particularly evident in connection with the operation of wheeled amphibious vehicles.

SUMMARY OF THE INVENTION

The present invention provides an impeller for substantially overcoming hydrodynamic drag, and which operates in a manner so as to convert such drag into forward thrust. In particular configurations as hereinafter described, the impeller wheel of the present invention also provides a significant amount of lift for a waterborne vehicle especially when rotated at high speed. In use on water vehicles the impeller wheel of the present invention is suitable for providing forward thrust with conventional hulls as well as planing hulls, hydroplanes or craft utilizing hydrofoils. To increase available thrust, additional impeller wheels are attached to the vehicle.

In one specific embodiment when applied to watercraft the impeller wheel provides lift as well as forward thrust thus causing that portion of the hull on which it is mounted to be raised above the static waterline as the speed of rotation of the wheel increases. When used on amphibious vehicles the wheel of the present invention can be used as a means of forward thrust only or in a combined function to provide support and thrust for a vehicle both on land and water.

The present invention provides an impeller wheel for a vehicle comprising a circular body and means for rotatably mounting the body on an axis located in a driving orientation relative to the vehicle. An impact surface is raised from the peripheral surface of the circular body extending transversely of said surface, said impact surface forming a predetermined angle with the peripheral surface lying between and interiorly of boundaries defined by a radius from the center of the circular body of the base of the impact surface and a tangent to the circular body at the base of the impact surface. A sloping surface is also provided extending from the apex of the impact surface to the peripheral surface in a direction away from the base of the impact surface such that the circular body, impact, sloping and peripheral surfaces define a continuous closed surface.

By the foregoing a drive system for watercraft can be provided which eliminates propeller and water jet drag and converts hydrodynamic drag on the circular body into thrust, improving the efficiency of the propulsion means over that heretofore available. The structure has no theoretical speed limitation such as is characteristic of hydrofoils and when used on a watertight land and water going craft provides a vehicle which has a fully amphibious, high-speed capability. The present invention also provides a land vehicle tire design capable of efficient operation in mud, sand, etc. In such an application the operation of the impeller wheel is analogous to the operation of a saw blade in the sense that, at impact, each impeller blade cuts its way into and through the soft terrain. This is to be contrasted especially with previous types of mud and snow tires which operate in a "pushing" manner on the soft terrain. Thus, in an overall sense, the invention provides a support and thrust mechanism for an amphibious vehicle permitting the vehicle to be driven on land or water with comparable speed, comfort and safety.

BRIEF DESCRIPTION OF THE DRAWING

The foregoing will be better understood by reference to the drawing wherein:

FIG. 3 is a side elevation of a specific embodiment of the drive wheel according to the present invention as attached to the rear of a boat hull;

FIG. 4A is a side elevation of an alternate embodiment of the drive wheel of FIG. 3;

FIGS. 4B and 4C are sectional views taken along lines 4B—4B and 4C—4C of FIG. 4A, respectively;

FIGS. 5A and 5B are schematic diagrams illustrating several possible locations of the drive wheel of the present invention with respect to a boat hull;

FIGS. 6A, 6B and 6C are front elevational views of alternate embodiments of the impeller wheel of the present invention;

FIG. 7 is a front elevational view of a pair of impeller wheels according to the present invention having an auxiliary paddle wheel mounted in-between;

FIG. 8 is an elevational view of another alternate embodiment of the impeller wheel of the present invention; and FIG. 9 is a sectional view of a wheel similar to that shown in FIG. 8 which is equipped with riding ribs located between rows of adjacent impact surface projections.

DESCRIPTION OF A SPECIFIC EMBODIMENT

Figure 1:
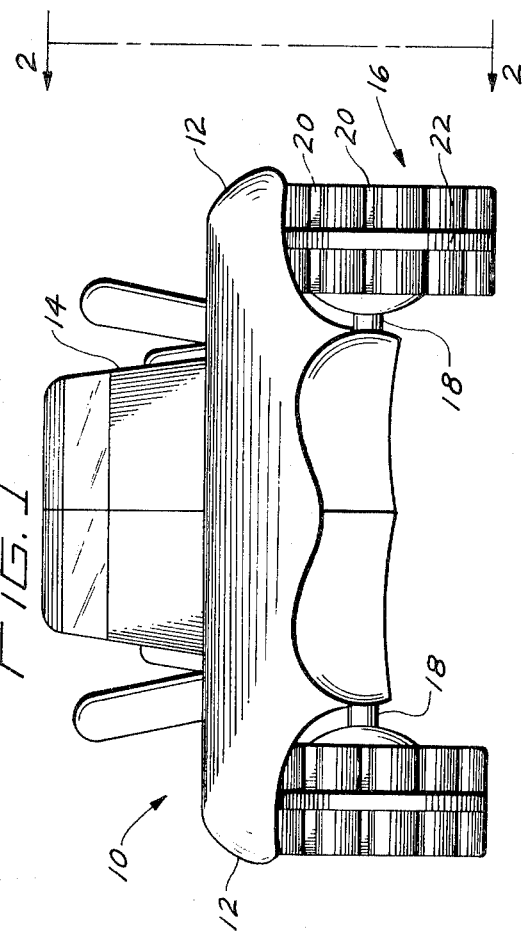
FIG. 1 is a front elevation of an amphibious vehicle utilizing the drive means of the present invention.
Figure 2:
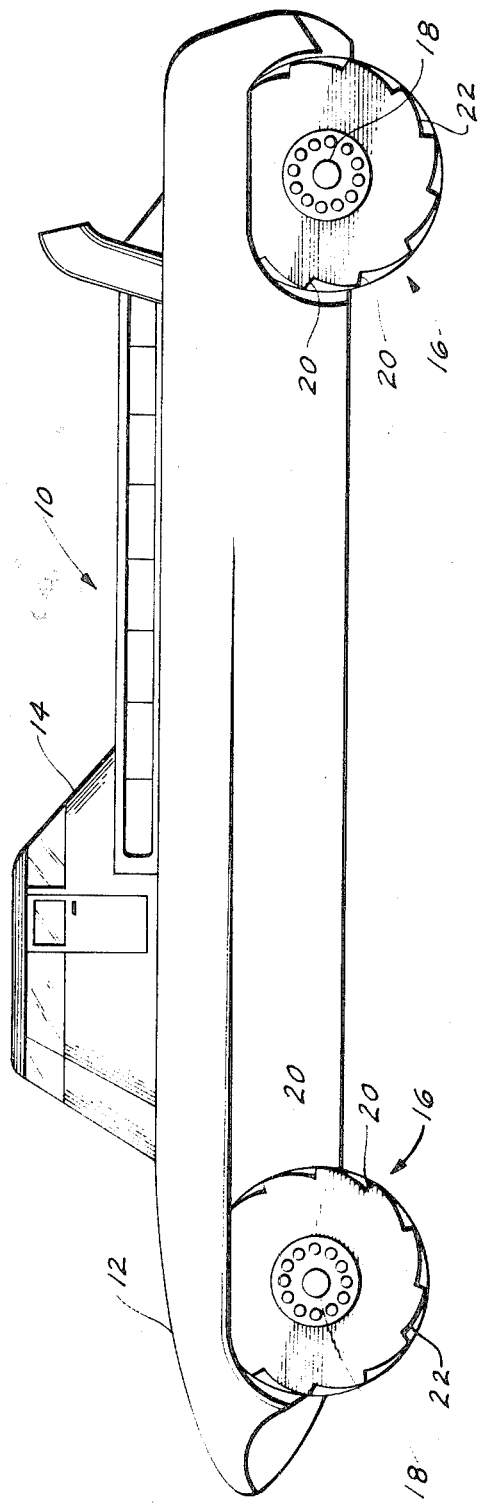
FIG. 2 is a side elevation of the vehicle shown in FIG. 1 taken along lines 2—2.

Referring now to FIGS. 1 and 2, there is shown therein an amphibious vehicle 10 comprising a hull 12 and a cockpit 14 mounted on the hull. Attached at the four corners of the hull in a conventional four-wheel vehicle orientation are impeller wheels 16 according to the present invention. As shown therein, wheels 16 are mounted on axles 18 for driving rotation thereabout. Located on the peripheral surface of each of the wheels 16 are a plurality of impact surfaces 20 to provide forward propulsion for vehicle 10 whether the hull is waterborne or rolling over a soft terrain.

The specific structural details of the impact surfaces relative to the drive wheel will be discussed in detail in conjunction with the subsequent figures of the drawing. In one embodiment of the impeller wheel of the present invention, the riding qualities of the vehicle when used on a solid surface are improved by providing a peripheral rib 22 which is superimposed over surfaces 20 and extends around the circumference of wheel 16 to provide a continuous surface for the wheel to roll on. This eliminates the sensation of pounding from being transmitted to the vehicle as each impact surface 20 rotates down to and comes in contact with the solid surface. In another embodiment of the present invention a pair of peripheral ribs are provided on each impeller wheel located along the outside edges of the peripheral surface of the wheel.

A specific embodiment of the impeller wheel shown in FIGS. 1 and 2 as used in a waterborne application is shown in FIG. 3. As shown therein the impeller wheel comprises a circular body 24 mounted on a support 26 for rotation about an axis 28. Support 26 is located immediately aft of a transom 30 of a boat hull 32. In solid outline hull 32 represents the rear end of a three-point hydroplane when this vessel is under way. Its waterline is indicated at 37. Body 24 is mounted on axis 28 for counterclockwise rotation in the direction of the arrow 34 shown in FIG. 3.

Raised from the peripheral surface 35 of body 24 are six impact surfaces 36 which are approximately evenly spaced along the circumference of body 24. Each impact surface 36 is formed at an angle with respect to surface 35 such that the impact surface is approximately parallel to the static waterline 38 at the moment of entry of said surface into the water. It can further be observed from FIG. 3 that as each of said impact surfaces rotates through the water and emerges aft of the vehicle that surface 36 is approximately vertical.

From the apex 40 of each impact surface a connection curved surface 42 having a radius of curvature such that surface 42 extends in a direction from the apex 40 to one impact surface 36 to the base 44 of the next succeeding impact surface 36 and inwardly toward the center of rotation of body 24. An imaginary surface of revolution having a radius equal to the distance of base 44 from the axis 28 defines an imaginary peripheral surface of the wheel. Said peripheral surface extends around the circumference of the wheel coincident with the location of the bases 44. Together with the side portions of the body 24, a continuous closed surface is defined preventing the development of partial vacuum behind the impact surfaces as they enter the water. This reduces the possibility of suction and cavitation along surface 42 from detracting from the drive function of the wheel, particularly at low hull speed and high power requirements. The closed continuous surface yields a wheel of high structural integrity which readily lends itself to construction in the form of a tire. The closed continuous side portions of the wheel also deter the creation of suction in the areas adjacent the side portions further enhancing the efficiency of the wheel.

Utilizing a principle similar to that employed in paddle wheel boats, the drive wheel of the present invention provides a closed surface which has a series of faces raised from the exterior or peripheral surface and inclined so as to strike the surface of the water at a predetermined angle. By limiting the angle which the impact surfaces make with the surfaces of water when the watercraft to which the wheel is attached is standing or moving at slow speed to between approximately 0° and 45°, a resultant thrust vector 48 is developed which is inclined at an angle upward relative to the horizontal and is pointed in the direction of rotation of the wheel (the forward direction of the vehicle). The thrust vector 48 thus not only represents forward propulsion for the vehicle but also upward lift tending to raise the assembly out of the water. By virtue of the limited water-surface angle at impact it can also be seen that as the surface clears the water after having rotated therethrough, it will be inclined at an angle of approximately 90° to the horizontal effectively preventing it from raising significant quantities of water as it surfaces and adversely affecting the thrust vector angle of inclination.

The embodiment of the impeller wheel shown in FIG. 3 is particularly suitable for use with a planing hull and a three-point hydroplane hull as well as a conventional displacement hull. When used to provide forward thrust for a three-point hydroplane, it can be seen that the upwardly angled thrust vector will tend to assist the portion of the assembly to which the wheel is attached to rise in the water from the ghosted outline of hull 32 to the position of the hull shown in solid outline at waterline 38. On a planing hull, the water level drops to level 37 underway changing the angle of impact of surfaces 36 and converting a portion of lifting force into forward thrust. It is further contemplated that the width of the impeller will be limited to a dimension such that the wheel will not "plane" up as the vehicle is driven through waves, an action which would tend to create a rough, pounding ride over the water surface. The particular dimension of the width of the wheel will vary depending upon the size and weight of the vehicle with which it is used and the powerplant available for rotating it.

In FIG. 3 a spray shield 45 is provided over the wheel for preventing water from being thrown by the wheel onto the hull within which it is used. Spray shield 45 is given a particular configuration such that its interior surface gradually approaches the apex 40 of the impact surfaces 36 as they rotate forward and downwardly toward the water level creating a constantly diminishing dimension. This relationship of impact surfaces and spray shield interior provides an action similar to an impeller pump when the wheel is rotated faster than the vehicle moves forward, causing water driven into the spray shield housing to be driven around and out in a stream 47 directly down toward the water rather than being thrown upwardly and rearwardly of the wheel. The same action obtains when the vehicle is run on land over slush and watery mud.

In operation on a watercraft as in FIG. 3, the wheel of the present invention is rotated by a power drive unit (not shown) located in the hull and operatively linked to axle 28. For applications where the wheel is used on a high-speed hull, a geared transmission linking the drive unit and impeller wheel may be necessary for changing gear ratios when the wheel is rotating at high speed.

The solid outline of FIG. 3 illustrates the impeller wheel of the present invention mounted outboard of the hull that it is to drive. As shown by the ghosted rendition 46 of the transom, the drive wheel of the present invention can also be mounted inboard of the vehicle, in which case the superstructure of the boat itself acts as a spray shield. Where desired, a close fitting housing can be disposed over the wheel 24 to provide the impeller pump action in this configuration as well.

The wheel shown in FIG. 4A illustrates two embodiments of an impeller for providing continuous lift for a vehicle with which it is used. To raise the hull of the vehicle clear of the water, it is contemplated that one impeller wheel in conjunction with one or more hydrofoils or three or more impeller wheels in tricycle or similar arrangement will be necessary. The peripheral or treaded surface of the two alternate embodiments of FIG. 4A are also shown in the sectional views, FIGS. 4B and 4C. In FIG. 4A, 12 impact surfaces 52 are distributed around the circumference of an impeller wheel 48 which comprises a circular body 50 on which are superimposed the plurality of impact surfaces, surfaces which are inclined at a predetermined angle to the surface of body 50. Wheel 48 is mounted for counterclockwise rotation (arrow 49) and impact surfaces are shown in relation to a static waterline 55 and a high-speed waterline 57. Compared to the impact surface in the embodiment of FIG. 3, surfaces 52 form a slight angle with the static waterline at the moment the base 53 of such surfaces contacts the water rather than being approximately parallel. Likewise, upon exit from the water at the static waterline, surfaces 52 are more nearly vertical than the embodiment of FIG. 3. The result of this configuration is to produce a resultant thrust vector 58 which is inclined upwardly at a greater angle than that produced by the embodiment of FIG. 3, thereby giving the impeller or drive wheel of the present invention increased lift capability sufficient to raise that portion of the vehicle which it is associated out of the water without regard to the hull configuration.

Shown in FIGS. 4B and 4C are cross-sectional views of the wheel taken along lines 4B—4B and 4C—4C of FIG. 4A. In FIG. 4B impact surfaces 52 are provided with lateral flanges 54 extending radially along the side of the wheel toward its axis of rotation. A riding rib 56 is also shown located approximately in the center of the peripheral surface of the body 50 for giving the wheel the capability of rolling on solid surface. FIG. 4C shows an alternate embodiment of the impact surfaces and in this case surfaces 52 extend transversely of the wheel body and terminate at the sides thereof without extending radially inwardly toward the axis of rotation. A riding rib 56 is again shown on this embodiment of the drive wheel. Compared to the pontoons of the prior art, e.g., U.S. Pat. No. 3,166,039, the impeller wheel of the present invention provides impact surfaces of greatly increased area on a substantially smaller wheel and in combination with the remaining structural portions of the wheel forms a continuous closed surface suitable for construction in the form of a tire.

The embodiments shown in FIGS. 4A–C are preferred when used on an amphibious vehicle. The number and configuration of impact surfaces on the wheel make it particularly useful in mud, sand and snow, etc. On such terrain types, the tire, in effect, chops the mud immediately in front of the wheel and as rotation continues the wheel rises over (rather than pushing through) the material throwing it to the rear and thereby obtaining forward propulsion. In the various embodiments shown, the wheel can be solid, hollow or pneumatic, or rubber, steel or other suitable materials depending upon the particular application, environments, and strength requirements of the vehicle on which it is to be used. Normally the wheel of the present invention will be provided in a pneumatic configuration when intended for amphibious or "land only" use. The riding rib or ribs 56 may be provided when used on a vehicle operated over hard and rigid surfaces. The impact surfaces normally define an acute angle of between 10° and 60° with the vertical at the point of maximum vertical excursion. Angled in this manner such impact surfaces normally form an angle with the surface of water at the moment of impact of between 0° and 45°.

The wheel of the present invention can be located in a number of positions when employed on a water-going vehicle. This includes, but is not limited to, vehicles provided with a single or multi-wheel drive. It is mountable in both a rigid or steerable configuration. When rigidly mounted, steering is provided either by equipping the vehicle with a rudder or providing two or more impeller wheels, all of which are offset from the centerline of the vehicle. By driving the wheel or wheels on one or the other side, the vehicle can be steered in a manner similar to a track vehicle on land. FIGS. 5A and B illustrate a watercraft using a one-wheel drive in both a rigid and steerable configuration. As shown in FIG. 5A, the rigid embodiment, a drive wheel 58 can be mounted outboard at the stern of the vehicle, inboard at the stern of the vehicle, amidships and at the bow. Hydrofoils 60 may be provided for adding to the lift capability of the vehicle and reducing drag. When used with a hydrofoil equipped vessel, the impeller wheel may be mounted on a pivoted arm to retain the capability of engaging the water when the vessel is under way. FIG. 5B shows drive wheel 58 located in the same positions relative to the craft as is shown in FIG. 5A in a steerable configuration. Multiple wheel variations of the configurations shown in FIGS. 5A and B with and without the use of hydrofoils are also contemplated.

Figure 6C:
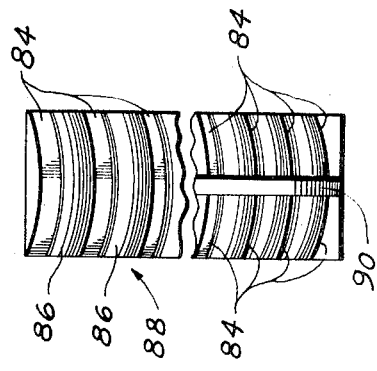

Alternate embodiments of impact surfaces provided on an impeller wheel according to the present invention are shown in FIGS. 6A, 6B and 6C. Each of said figures provides a front elevational view. In FIG. 6A an impeller wheel 61 is provided with a set of impact surfaces 62 located on one side of riding rib 64 and a second set of impact surfaces 66 on the side of the rib opposite set 62. Each surface of the two sets is offset or staggered relative to the nearest surfaces on the opposite side of the rib, the configuration being suited for paved road operation for further ensuring of a smooth ride for the vehicle being supported thereon. In FIG. 6B, two embodiments of a wheel 68 having impact surfaces 70 inclined at an acute angle relative to the horizontal are shown. In one embodiment, the impact surfaces 70 extend from the lateral edges of the wheel and meet at a common line 73 located approximately halfway between said edges. In the second embodiment a riding rib 72 is located in the center of the tire abutting the interior edges of impact surfaces. In some high-speed applications it is contemplated that the slanted impact surfaces will also provide a smoother ride over water while, at the same time, reducing the force of impact as each surface strikes the water. In FIG. 6C, two additional embodiments of a wheel similar to those in FIG. 6B are shown. In one embodiment curved impact surfaces 84 extend transversely across the peripheral surface 86 of a wheel 88. In the second embodiment a riding rib 90 extends around the circumference of the wheel interconnecting successive impact surfaces 84 approximately in the center thereof. In the embodiments of FIGS. 6B and 6C it is contemplated that in certain applications for the wheel, the V-shaped and curved impact surfaces can be inverted so that they slope in the opposite direction.

FIG. 7 illustrates still another embodiment impeller wheel of the invention. In this embodiment, additional thrust is provided in the form of a paddle wheel 74 mounted between a pair of impeller tires 76. Similarly, a removable impeller (not shown) may also be provided coaxially mounted at the side of an impeller tire to provide additional thrust. In the embodiment shown in FIG. 7, the diameter of paddle wheel 74 is smaller than the diameter of tires 76. According to the particular application and thrust requirements for such combinations of impeller tires and paddle wheels, it is contemplated that the diameter of the paddle wheel will vary relative to the diameter of the impeller with which it is used.

Still other embodiments of the impeller of the present invention are shown in FIGS. 8 and 9. In these embodiments a plurality of discrete knoblike impact-sloping surface treads 78 are raised from the peripheral surface of a circular tire body. FIG. 8 illustrates a staggered pattern of such projections or knobs. FIG. 9 illustrates a sectional view of an aligned arrangement of such projections 78. For improved riding qualities several riding ribs 82, located in the spaces between projections are provided.

What is claimed is:

1. An impeller wheel for a vehicle comprising:
    a cylindrical body;
    means for rotatably mounting the body on an axis located in a driving orientation relative to the vehicle;
    an impact surface raised from and extending transversely of the peripheral surface of said cylindrical body and lying in a plane passing to the fore of said axis and defining an acute angle between approximately 10° and 60° with the vertical at the point of maximum vertical excursion; and
    a convex surface extending continuously from the apex of the impact surface to the base of the next impact surface in a direction inwardly toward the axis of rotation such that the circular body, impact, convex, and peripheral surfaces define a continuous closed surface and cavitation behind the impact surface is substantially reduced.

2. A wheel according to claim 1 including a plurality of said impact surfaces provided at spaced intervals around the peripheral surface of the cylindrical body.

3. A wheel according to claim 2 for use in driving a water vehicle wherein each impact surface is oriented relative to the peripheral surface so as to form an angle with the surface of the water at the moment of impact of between 0° and 45°.

4. A wheel according to claim 3 including an impeller pump housing disposed about the wheel to increase the thrust developed by the wheel when the wheel is rotated in liquid and semiliquid media.

5. A wheel according to claim 2 wherein each of the impact surfaces extends across the entire peripheral surface of the circular body.

6. A wheel according to claim 2 wherein the lateral length of each impact surface is approximately one-half the width of the peripheral surface and the impact surfaces extending inwardly from one side of the wheel are offset relative to the impact surfaces extending from the opposite side of the wheel.

7. A wheel according to claim 2 wherein each impact and sloping surface forms a small, discrete knob projecting from the peripheral surface of the circular body, the plurality of knobs being distributed over the surface thereof in a predetermined pattern.

8. A wheel according to claim 2 for use on hard surfaces including a riding rib disposed around the outer surface of the wheel and interconnecting the apex and face of adjacent impact surfaces.

9. A wheel according to claim 8 wherein the riding rib is located interiorly of the lateral edges of the peripheral surface of the tire.

10. A wheel according to claim 9 including at least two riding ribs located on the peripheral surface of the wheel.

11. A wheel according to claim 2 wherein the circuit body, impact, curved and peripheral surfaces define a solid tire.

12. A wheel according to claim 2 wherein the circular body, impact, convex and peripheral surfaces define a hollow tire.

13. A wheel according to claim 12 wherein the circular body, impact, convex and peripheral surfaces define a pneumatic tire.

14. An amphibious vehicle comprising:
a watertight vehicle body;
a rotatably mounted impeller wheel in the form of a cylindrical body secured to the vehicle body;
means for rotatably mounting the cylindrical body on an axis located in a driving orientation relative to the vehicle;
an impact surface raised from and extending transversely of the peripheral surface of said cylindrical body and lying in a plane passing to the fore of said axis and defining an acute angle with the vertical to the rear of the vertical at the point of maximum vertical excursion;
a convex surface extending continuously from the apex of the impact surface to the base of the next impact surface in a direction inwardly toward the axis of rotation such that the circular body, impact, convex, and peripheral surfaces define a continuous closed surface and cavitation behind the impact surface is substantially reduced;
power means mounted in the vehicle body and mechanically linked to the impeller wheel for providing rotational drive for the impeller wheel; and
steering means mounted in the vehicle and linked to the impeller wheel for controlling the direction of travel of the vehicle.

15. An amphibious vehicle according to claim 14 including at least one hydrofoil attached to the hull for supporting the vehicle in motion when travelling over water.

16. An amphibious vehicle according to claim 15 wherein at least one impeller wheel is mounted in a spaced relation to at least two associated impeller wheels whereby the vehicle is supported by said wheels when standing on a solid surface.

17. An amphibious vehicle according to claim 14 wherein a pair of primary impeller wheels are mounted in a side-by-side relationship with an auxiliary paddle wheel mounted between said pair of primary wheels.

18. An amphibious vehicle according to claim 14 including a removable auxiliary paddle wheel mounted on at least one of said impeller wheels.

19. A vehicle according to claim 14 including an impeller pump housing disposed about the impeller wheel for increasing the thrust imparted to the vehicle when the wheel is rotated in liquid and semiliquid media.

* * * * *